No. 804,931. PATENTED NOV. 21, 1905.
G. E. CASSEL.
APPARATUS FOR ELECTROLYTICAL DECOMPOSITION.
APPLICATION FILED MAY 4, 1905.
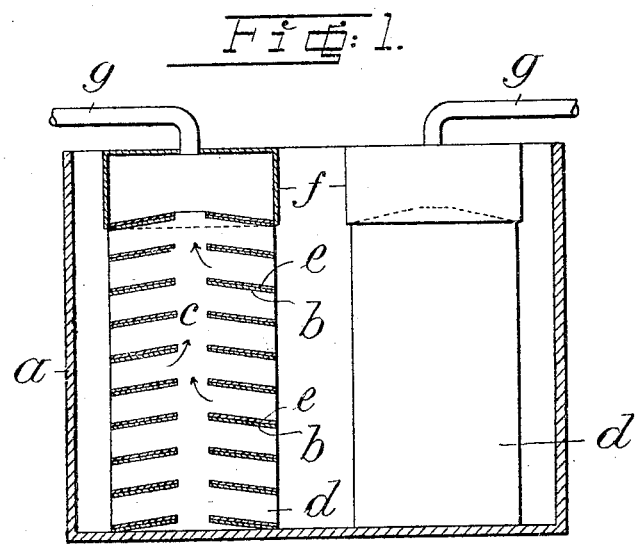
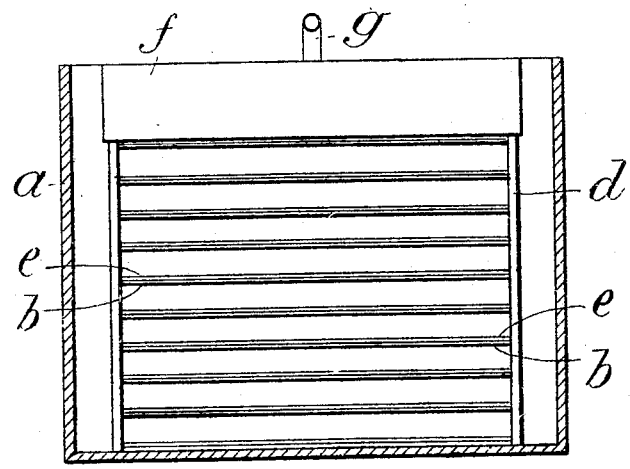
Witnesses:
Geo. Heinicke
F. Dittmar.
Inventor:
Gunnar Elias Cassel
by G. Dittman
Attorney.

UNITED STATES PATENT OFFICE.

GUNNAR ELIAS CASSEL, OF STOCKHOLM, SWEDEN.

APPARATUS FOR ELECTROLYTICAL DECOMPOSITION.

No. 804,931.     Specification of Letters Patent.     Patented Nov. 21, 1905.

Application filed May 4, 1905. Serial No. 258,836.

*To all whom it may concern:*

Be it known that I, GUNNAR ELIAS CASSEL, chemical engineer, a subject of the King of Sweden and Norway, residing at 27 Birger Jarlsgatan, Stockholm, Sweden, have invented new and useful Improvements in Apparatus for Electrolytical Decomposition, of which the following is a specification.

The present invention relates to an apparatus for electrolytical decomposition of solutions with products of decomposition, being wholly or partly of a gaseous nature, to be collected independently of one another.

The invention is illustrated in the accompanying drawings, in which—

Figure 1 illustrates the apparatus referred to in an end view, partly in section, while Fig. 2 shows the apparatus in a side elevation, one of the walls being removed.

The apparatus consists of a tank or vessel for the electrolyte, into which two electrodes of special construction are immersed, one being the anode, the other the cathode. These electrodes consist each of two end plates $d$ and of a number of inclined plates $b$ of about half the width of the end plates, which are arranged above one another in rows between said end plates $d$, separated by spaces $c$ between their meeting edges. The end plates $d$ are made of conducting material and their outsides are insulated in a suitable manner in order to prevent generation of gas thereon. The top surfaces of the inclined plates $b$ are covered by plates $e$ of glass or the like to prevent the formation of small gas bubbles, which, owing to diffusion, would pass out into the electrolyte. All the gas formed, therefore, develops on the under sides of the plates $b$, and in striving to ascend the gas is compelled to pass through the spaces $c$. A closed non-conducting hood $f$ is arranged above the plates, extending from one end plate to the other. Said hood is provided with a pipe $g$, through which the gas formed at the cathode or the anode can be withdrawn separately without the use of a diaphragm.

I am aware that inclined plates have been used in anodes and cathodes for the purpose of separating the gases disengaged by electricity, and I do not claim them generally.

What I do claim, and desire to secure by Letters Patent, is—

In apparatus for electrolytical decomposition, an electrode composed of two end plates of conducting material, of superposed upwardly-inclined plates between the end plates being approximately of half the width of the end plates, and being inclined toward each other and having between their meeting edges spaces $c$, and of a closed hood with eduction-pipe extending from one end plate to the other over the spaces $c$ and over all inclined plates substantially as described.

In testimony whereof I have signed my name to this specification in the presence of two subscribing witnesses.

GUNNAR ELIAS CASSEL.

Witnesses:
   H. TELANDER,
   J. A. MARKMAN.